United States Patent Office 3,037,902
Patented June 5, 1962

3,037,902
PARTIAL ACETYLATION OF CELLULOSE
Michael D. Fahey, Shelton, Wash., Robert S. Tabke, Parsippany, N.J., and Robert G. Rickey, Shelton, Wash., assignors to Rayonier Incorporated, Shelton, Wash., a corporation of Delaware
No Drawing. Filed Dec. 22, 1960, Ser. No. 77,491
10 Claims. (Cl. 162—157)

This invention relates to the partial acetylation of cellulose fibers with retention of the fiber structure, and has for its object the provision of an improved process which results in an improved acetylated cellulose. The invention is based on our discovery that a heat-stable, partially acetylated fibrous product can be produced by reacting simultaneously or successively the cellulose fibers with acetic acid and acetic anhydride under anhydrous conditions, without a catalyst, and at an elevated temperature. The invention provides a controlled direct reaction process which is simple, rapid and inexpensive resulting in a superior fibrous product.

At the present time all known commercial processes for the manufacture of partially acetylated cellulose with retention of fibrous form are based on catalyzed esterification procedures. The use of catalysts presents many and serious problems. Effective acid catalysts are usually strong mineral acids and, of course, quite corrosive. They weaken the fiber through hydrolytic attack on the cellulose. Some, such as sulfuric acid, react with the cellulose forming esters which carry over into and tend to make the products unstable. Others, such as perchloric acid, are hazardous to use and so efficient as catalysts that control of the esterification becomes difficult and requires extreme caution. Moreover, for practical reasons, it is desirable in partial acetylations to recycle and reuse the reagents. In order to prevent "build-up" and to control the catalyst in such cases it then becomes necessary to process the recycled or reused liquors, adding greatly to the cost of the system.

In order to get around some of the deleterious effects of said acid catalysts, alkaline and salt catalysts have been proposed. Pyridine which is the best catalyst of this type is much too expensive for commercial use in the quantities required for effective action, while salts such as various alkali metal acetates and zinc chloride are inefficient as catalysts requiring the use of large quantities of the material, long reaction cycles, and special washing and catalyst recovery systems.

The present invention obviates the difficulties mentioned above in the manufacture of a high quality, fibrous, partially acetylated cellulose. We have found that it is possible by means of the invention to acetylate cellulose fiber without the use of a catalyst of any kind up to acetyl contents of about 30 percent. The reaction is relatively simple, extremely rapid and easily controlled and by proper selection of operating conditions, partially acetylated celluloses of a wide range of acetyl contents having high instrinsic viscosity, good strength, excellent heat stability and other desirable properties generally associated with high grade partially acetylated cellulose can be obtained. Furthermore, using the process of the present invention, liquor recycle costs, reaction control, liquor recovery, catalyst recovery and product stability, which are problems of great concern in catalyzed partial acetylation processes are either greatly reduced or eliminated entirely.

The fact that a high-viscosity, stable, fibrous, partially acetylated material could be obtained by acetylating cellulose with acetic acid and acetic anhydride alone, in the absence of any acetylation catalyst whatsoever, rapidly and without excessive hydrolysis or other degradation was completely unexpected as the prior art has always indicated that acetylation by direct non-catalyzed methods to any appreciable degree is impossible unless accompanied by serious degradation and usually by loss of fiber form.

The process of the invention is preferably carried out by forming a slurry of the cellulosic fiber with balanced amounts of acetic acid and acetic anhydride under anhydrous conditions (with or without pretreatment of the cellulose with acetic acid), heating said slurry rapidly to a temperature within the range of about 135° to 280° C., holding it at said temperature for from about 180 to 1.5 minutes, cooling to slow-down the reaction, removing residual acetylation liquor by filtration or otherwise and washing and/or drying the product. By selection of a suitable combination of temperature and time in the foregoing process an improved partially acetylated cellulosic fiber can be obtained with any desired acetyl content within the indicated range, as will be demonstrated in more detail in the examples. Partially acetylated cellulosic fiber produced in this manner involving preswelling will be found to have a higher degree of polymerization (D.P.) as measured by intrinsic viscosity (less degradation or hydrolysis), better electrical resistance properties and greater heat stability than products of similar acetyl content produced by previously known acid catalyzed processes and be as good a product as that produced by the best of the more costly and time-consuming alkaline or neutral salt catalyzed processes.

Refined or semi-refined cellulose fiber from any of the usual sources such as wood pulp and cotton linters, are amenable to the methods of this invention. Although it is not critical, for reasons of economy, the cellulose fiber should be at least air dry. Then in order to acetylate it to any desired acetyl content up to say about 30 percent, it will be found that the higher the temperature used within the range of about 135° to 280° C., the shorter will be the time required for acetylation and vice versa. It will also be found that for any particular source of cellulosic fiber chosen, there are various combinations of temperature and time that will yield products with the same acetyl contents and that said products will have almost identical physical and chemical properties. For example, a paper pulp acetylated at 150° C. for 120 minutes yielded a product that was identical as far as could be determined with a product obtained when a sample of the same pulp was acetylated at 240° C. for only 1.5 minutes. This flexibility of choice in selecting the exact operating conditions to be used in obtaining a given product is valuable. It renders the over-all process adaptable to a wide variety of equipment and other operation limitations that may come up.

In the process of our invention, it is preferable to swell the fiber with acetic acid before its acetylation with the anhydride. At lower temperatures below, say, about 200° C., this can be done by simultaneous addition of acetic acid and anhydride as the acetylation media and without a pretreatment step. The action of the anhydride on the cellulose is slow enough to permit the acetylation and swelling to go on simultaneously. As the temperature is raised, however, and particularly as it begins to go over about 200° C., the acetylating action of the anhydride becomes so rapid that it interferes with the slower swelling action of the acid and a suitable acetylation is not obtained. An acid pretreatment then becomes essential. Such a pretreatment comprises treatment of the cellulose with from about 0.25 to 2.5 parts of glacial acetic acid per part of cellulose for about 15 minutes or longer at room temperature or thereabouts prior to acetylation. The pretreated pulp is then acetylated without removal of the pretreatment acid and without washing.

The ratio of acetylating liquor to fiber is not critical as long as sufficient fluid is present to provide a workable slurry. For slurries, however, that are both operable and convenient we prefer consistencies ranging from about 10 to about 30 percent. In any case, sufficient glacial acetic acid must be present, either as a pretreatment fluid or in the acetylation liquor itself to swell the cellulose fiber, say from about 0.25 to 5.0, preferably from 1.5 to 2.5, times the weight of the dry cellulose. Amounts smaller than these do not satisfactorily swell the fiber while greater amounts tend to hydrolyze and degrade the final product. Care must be taken not to use too great an excess of acetic acid over that required to swell the fiber since it has a tendency to hydrolyze (degrade) the final product. On the other hand, sufficient acid must always be used either during the preteatment or in the acetylation itself to swell the fiber and thereby permit it to esterify rapidly and uniformly to the desired acetyl content. Acetic anhydride, the other essential ingredient of the acetylation liquor must be present in a substantial excess over that theoretically needed to supply the desired acetyl groups on the given amount of fiber. The ratio of acetic anhydride to glacial acetic acid (including that used in the pretreatment, if any) should always be in excess of 1.0 up to a maximum of about 10.0. Frequently where a substantial pretreatment has been used, as when using high temperatures and short acetylations, only anhydride will be added to the pretreated fiber.

When the fiber has been acetylated to the desired acetyl content, the slurry is quickly cooled sufficiently to slow-down the acetylation reaction and the partially acetylated product is separated from the excess acetylation liquor either by filtration or evaporation to prevent hydrolysis and unwanted degradation. The product can then be washed with water to remove residual acetylating liquor and dried or it can be dried directly without washing by merely evaporating off said residual liquor. The method to be used will depend upon the characteristics desired. If the partially acetylated cellulose is washed with water prior to drying, it will be almost indistinguishable physically from the original untreated fiber, but will actually have improved electrical resistance, heat stability, resistance to mildew, rot, etc. On the other hand, if it is dried directly from the acetylation liquor without washing, it will have an even higher electrical resistance than the washed product, but will be stiffer and feel harsher than the original untreated fiber. In both cases, however, the product of the process of the present invention will be found to have better physical and chemical properties than partially acetylated cellulose fibers of similar acetyl content prepared by conventional methods, particularly those prepared using sulfuric acid catalysts.

Whenever reference herein is made to acetic acid, it is to be understood that said acid is "glacial," in order to maintain anhydrous conditions, and preferably contains less than 0.5% of water.

The following examples illustrate processes of the invention:

EXAMPLE 1

This example illustrates the partial acetylation of a commercial paper grade wood pulp to yield partially acetylated cellulose fibers, useful, for example, in electrical laminating paper. The acetylation temperatures range from 144 to 174° C. and the pulp was not pretreated.

(a) *Acetyl Content 15.9 Percent Attained*

8.26 kg. (equivalent to 8.0 kg. oven dry) commercial, paper grade sulfite wood pulp having a cuene I.V. of 8.0, 19.10 kg. of acetic anhydride (17.60 kg. for the pulp and 1.50 kg. for the $H_2O$ therein) and 12.64 kg. of glacial acetic acid were placed in a stainless steel cooker pot with a sweep type agitator. The pot was closed and the agitator started. The temperature was quickly raised to 145° C.±1° C., and held there for 120 minutes. The slurry was then quickly cooled to room temperature, the excess acetylation liquor drained off and the product thoroughly washed with water and dried. The partially acetylated cellulose was found to have an acetyl content of 15.9, a cuene I.V. of 5.7, and excellent dielectric resistance, physical strength, dimensional stability and other properties required in an electrical laminating paper.

(b) *Acetyl Content 18.9 Percent Attained*

The foregoing acetylation was repeated with a similar slurry of another portion of the same pulp and liquor as used in the preceding section and using exactly the same methods except that the acetylation temperature was increased to 155±1° C. This time the product had an acetyl content of 18.9 percent, and a cuene I.V. of 5.2 while the other properties remained substantially unchanged from those of the product of said preceding section.

(c) *Acetyl Content 24.1 Percent Attained*

The foregoing acetylation was repeated with a similar slurry of another portion of the same pulp and liquor as before except that this time the temperature of the acetylation was raised to 172±2° C. The acetyl content of the product was found to be 24.1 percent and the I.V. 4.74. While the other properties of this product were not quite as good for some purposes as those of the preceding sections they were still completely satisfactory for use in a laminating paper and superior to similar products produced using acid catalysts. The partial acetates prepared in this example are unique in that they have a higher acetyl content at a higher DP level (less degradation) than similar partial acetates prepared by other known methods. Furthermore, the heat and dimensional stability of the products were exceptionally good.

EXAMPLE 2

This example illustrates the acetylation of a cellulose wood pulp using a high temperature, short time acetylation procedure and the pretreatment required in such cases.

A sample of a commercial grade sulfite wood pulp with a cuene I.V. of 8.2 was pretreated with one-half its weight of glacial acetic acid for 2 hours at 30° C. The pretreatment was carried out in sealed bottles placed in a thermostatically controlled roller cabinet. The pretreated pulp was then removed from the bottles, divided into two portions and acetylated as follows:

(a) One portion of the foregoing pretreated pulp was placed in an American Instrument Co. "Preliminary Reaction Vessel" containing acetic anhydride. Sufficient pretreated pulp was added to make a slurry with the anhydride having a consistency of about 5 percent. The reaction vessel was then sealed and submerged in molten lead which had a temperature of 340° C. After 1.5 minutes submersion, the vessel was removed from the molten lead bath and allowed to hang in the air for 0.5 minute, then plunged into cold water to cool. The product was removed, washed, dried and analyzed. The maximum temperature attained during the treatment by the sample was from about 260 to 265° C. The partially acetylated cellulose had an acetyl content of 19.7 percent and a cuene I.V. of 7.11, showing very little degradation or hydrolysis.

(b) The second portion of the pretreated pulp was acetylated in the same manner and with the same equipment as in the preceding section except that it was immersed in the molten lead bath for only 1.0 minute instead of for 1.5 minutes. Analysis of this sample showed it to contain 12.7 percent acetyl and to have a cuene I.V. of 7.42.

The foregoing demonstrate the extreme rapidity of the high temperature, non-catalyzed process and the surprisingly high I.V.'s indicate an absolute minimum of degradation or hydrolysis.

EXAMPLE 3

This example demonstrates that the partially acetylated cellulose product obtained by the methods of the present invention can be dried directly from the acetylating liquor without washing to form a product with improved properties.

2.38 kg. of a commercial grade of sulfite wood pulp in the form of American Pulverizer shreds were pretreated with 1.0 kg. of glacial acetic acid in a stainless steel cooker pot for 50 minutes at 35 to 40° C. The pretreated pulp was then acetylated by the addition of 4.26 kg. of acetic anhydride and raising the temperature to 150 to 155° C. within 35 minutes were it was held for 120 minutes. The consistency of the mixture being 30 percent and non-fluid in character, the product was dried in the cooker pot without attempting to filter off any of the acetylation liquor. Drying was accomplished by circulation of air through the mixture in the cooker pot for one hour at 110 to 127° C. The vaporized acetic acid and anhydride were recovered in a suitable condenser unit. At the end of 50 minutes of the drying, an analysis of the product showed it to have an acetyl content of 19.8 percent and a cuene I.V. of 5.85.

During the foregoing acetylation grab samples were taken of the reaction mixture at the times indicated in Table I. Each of these grab samples was divided into two portions, one of which was immediately placed in a forced draft oven and dried at a temperature of 136° C. for 30 minutes, while the other was thoroughly washed in water and dried for 3 hours at 105° C. in a forced draft oven. The progress of the acetylation and the effect of washing the samples prior to drying are shown in Table I.

TABLE I

| Sample | Time in Reactor, Hours-Mins. | Treatment of Product After Removal from Reactor | | | |
|---|---|---|---|---|---|
| | | Water - Washed and Dried, 3 Hours at 105° C. | | Air-Dried at 136° C. for 30 Minutes (No Wash) | |
| | | Acetyl Percent | I.V. | Acetyl Percent | I.V. |
| 1 | 0 : 05 | 0.84 | 8.51 | 4.0 | 8.01 |
| 2 | 0 : 35 | 9.9 | 7.42 | 10.6 | 7.30 |
| 3 | 1 : 05 | 12.8 | 6.98 | 13.8 | 6.55 |
| 4 | 1 : 35 | 15.2 | 6.60 | 16.1 | 6.27 |
| 5 | 2 : 35 | 18.5 | 6.26 | 19.1 | 5.99 |

It is apparent from the foregoing results that washing is not required to avoid degradation of the partially acetylated cellulose when produced by the present non-catalyzed process. Even when dried at 136° C., there was surprisingly little loss of I.V. at any given level of acetyl content.

EXAMPLE 4

As previously noted, partially acetylated cellulose fiber prepared by the processes of this invention has surprisingly higher transverse electrical resistance when dried without washing than when dried after washing. The reason for this is not known, but it is well illustrated by the following example.

Three samples of partially acetylated cellulose were prepared by the non-catalyzed method of the preceding examples. The first sample had an acetyl content of 17.7 percent and was dried in the cooker pot without washing. It was designated as sample A. A second sample was prepared in a similar manner from another pulp of the same type and had an acetyl content of 18.5 percent. Following the acetylation, it was also dried in the cooker pot without washing and was designated as sample B.

The third sample was prepared from the same type of pulp and acetylated in the same manner as A and B except that after acetylation it was washed from the cooker pot with water and thoroughly washed on a filter with additional water before drying. Its acetyl content was 18.0 percent and it was designated sample C. After drying the partially acetylated pulps were slurried up with pure water, made up into hand sheets suitable for determination of transverse electrical resistances and re-dried in the usual manner. Their transverse electrical resistances were then determined and the results listed in Table II.

Since an acetic-acid wash has an adverse effect on transverse electrical resistances of partially acetylated celluloses, whether used before or after the original drying following acetylation, some of the hand-sheets prepared above were given such an acetic-acid-water wash, then water-washed and re-dried to see if the unexpected improvement that resulted from direct drying would survive such a treatment. The results are listed in the second portion of Table II.

TABLE II

| First Series of Handsheets | | |
|---|---|---|
| Sample | Resistance in Megohms | Method of Preparation |
| A | 68,500 | Dried directly from reaction mixture without wash. |
| B | 65,000 | Do. |
| C | 15,000 | Thoroughly water-washed before drying. |

| Second Series of Handsheets | | |
|---|---|---|
| Sample | Resistance in Megohms | Method of Preparation |
| A | 10,000 | Treated as above and then washed with acetic-acid water mixture. |
| B | 10,000 | Do. |
| C | 6,500 | Do. |

The foregoing results demonstrate the tremendous increase in transverse electrical resistance that is obtained by drying the partially acetylated cellulose fiber directly from the acetylation mixture without washing. It also indicates that this benefit will persist to some extent through an intervening acetic acid-water wash after having once been dried directly.

We claim:
1. The process of producing partially acetylated cellulose fiber which comprises slurrying the cellulose fiber in acetic acid and acetic anhydride, the amount of acetic acid being sufficient to swell the fiber and the amount of acetic anhydride being sufficient to effect the esterification, and heating the mixture under anhydrous conditions at a temperature of from 135°–280° C. and without the use of a catalyst.

2. In the process of claim 1, producing fiber having from 10% to 30% of acetyl content.

3. In the process of claim 1, washing and drying the acetylated cellulose.

4. In the process of claim 1 drying the acetylated cellulose without washing.

5. The process of producing partially acetylated cellulose fiber which comprises mixing cellulose fiber first with from 0.25 to 5 parts of acetic acid per part of dry cellulose to swell the fiber and then with more acetic anhydride than necessary to add the desired acetyl content, the operation being carried out under anhydrous conditions and at an elevated temperature above 135° C.

6. The process of producing partially acetylated cellulose fiber which comprises agitating together a mixture of acetic acid, acetic anhydride and cellulose fiber under anhydrous conditions at a temperature of from 135°–280° C. without a catalyst to produce a containing at least a 10% acetyl content, and drying the acetylated fiber.

7. In the process of claim 6, washing the acetylated product and then drying it, and forming it into paper.

8. In the process of claim 6, using from 1.5 to 2.5 times the weight of cellulose of acetic acid and an excess of acetic anhydride over that necessary to provide the acetyl content.

9. The process of producing partially acetylated cellulose fiber which comprises mixing together cellulose fiber, sufficient acetic acid to swell the fiber and at least a sufficient amount of acetic anhydride to satisfy the acetyl content of from 10 to 30%, heating the mixture under anhydrous conditions at a temperature of from 220° to 260° C. for from 1.5 to 3 minutes and without a catalyst.

10. The process of producing partially acetylated cellulose fiber which comprises mixing together cellulose fiber, from 0.25 to 5 times the weight of the dry cellulose of glacial acetic acid to swell the fiber and sufficient acetic anhydride to produce the desired acetyl content, heating the mixture under anhydrous conditions and without a catalyst to a temperature of from 135° to 280° C. for from 180 to 1.5 minutes.

References Cited in the file of this patent

UNITED STATES PATENTS 2,992,156     Schulwitz _____ July 11, 1961

UNITED STATES PATENT OFFICE
CERTIFICATE OF CORRECTION

Patent No. 3,037,902                                        June 5, 1962

Michael D. Fahey et al.

It is hereby certified that error appears in the above numbered patent requiring correction and that the said Letters Patent should read as corrected below.

Column 7, line 3, after "a", second occurrence, insert -- product --.

Signed and sealed this 25th day of September 1962.

(SEAL)
Attest:

ERNEST W. SWIDER
Attesting Officer

DAVID L. LADD
Commissioner of Patents